United States Patent [19]

Cushnie et al.

[11] Patent Number: 5,735,977
[45] Date of Patent: Apr. 7, 1998

[54] PROCESS FOR REMOVAL OF POLYMER FOAMS FROM NICKEL-COATED SUBSTRATES

[75] Inventors: Kirt Kenneth Cushnie, Burlington; Scott Thomas Campbell, Oakville, both of Canada

[73] Assignee: Inco Limited, Toronto, Canada

[21] Appl. No.: 764,249

[22] Filed: Dec. 12, 1996

[51] Int. Cl.⁶ ........................................... C22B 5/20
[52] U.S. Cl. .................... 148/516; 148/675; 75/415; 29/426.4
[58] Field of Search .................. 148/516, 675; 75/415; 156/94; 29/426.4

[56] References Cited

U.S. PATENT DOCUMENTS

| | | | |
|---|---|---|---|
| 3,926,671 | 12/1975 | Gutjahr et al. | 136/29 |
| 4,957,543 | 9/1990 | Babjak et al. | 148/13 |
| 4,975,230 | 12/1990 | Pinkhasov | 264/59 |
| 5,374,491 | 12/1994 | Brannan et al. | 429/218 |

FOREIGN PATENT DOCUMENTS

| | | |
|---|---|---|
| 57-200554 | 8/1982 | Japan. |
| 6-248491 | 9/1994 | Japan. |
| 7-007765 | 1/1995 | Japan. |

*Primary Examiner*—George Wyszomierski
*Attorney, Agent, or Firm*—Blake T. Biederman; Edward A. Steen

[57] ABSTRACT

The method of the invention produces nickel structures from nickel-coated polymer substrates. The nickel-coated polymer substrate has a nickel outer layer and initially has a temperature where the outer nickel layer lacks burst openings. Rapidly exposing the nickel-coated polymer substrate to a temperature of at least about 600° C. thermally decomposes the polymer substrate and bursts holes through the outer nickel layer. The gases resulting from the thermally decomposed polymer substrate escape through the holes through the outer nickel layer to leave a nickel structure. Finally, annealing the nickel structure increases strength of the nickel structure to produce a ductile foam product.

17 Claims, 1 Drawing Sheet

PROCESS FOR REMOVAL OF POLYMER FOAMS FROM NICKEL-COATED SUBSTRATES

TECHNICAL FIELD

This invention relates to methods for removing polymer substrates from within nickel-coated structures. Specifically, this invention relates to methods of producing ductile nickel structures from nickel-coated polymer substrates.

BACKGROUND OF THE INVENTION

Recently, "nickel foam" battery plaques have captured a large percentage of the high performance battery market. Typically, manufacturers produce nickel foam by first depositing nickel on polyurethane foam substrates and then subjecting the foam to a two-step thermal treatment. The purpose of the first step is removal of the polyurethane substrate. Generally, manufacturers remove the polyurethane substrate by burning it in an atmosphere containing free oxygen. The conditions during this burn-out step determine the amount of residual carbon contaminating the nickel foam. In the second step, manufacturers anneal the nickel foam structure in a reducing atmosphere to return any nickel oxide formed during the first step back to a ductile metallic state.

To ensure removal of sufficient carbon, sintering processes generally optimize the polymer removal step. For example, Brannan et al., in U.S. Pat. No. 5,374,491, disclose thermally decomposing nickel-coated foam for about one hour at 500° C. in air. These extended thermal decomposition steps however, increase operating costs and tend to oxidize increased amounts of nickel. Similarly, E. Pinkhasov, in U.S. Pat. No. 4,975,230 ('230), discloses passing nickel foam through two separate furnaces. The first furnace decomposes the polymer substrate at 350° C. in an air atmosphere. After removing the polymer, the foam travels through an annealing furnace maintained at a temperature between 950° C. and 1250° C. This final annealing treatment transforms a brittle nickel structure into a ductile nickel foam for improved strength and workability. Unfortunately, this type of heat treatment tends to shrink the nickel foam. This shrinkage decreases porosity and reduces the amount of active mass available for loading into a battery plaque.

Two-stage polymer removal and annealing processes have the following disadvantages:

1) burning the polymer in the first step forms a brittle structure that complicates handling in the second step, especially when handling the continuous strips required by the battery industry;

2) the volume changes associated with nickel oxidation and subsequent reduction create stresses that can initiate new cracks or propagate pre-existing cracks; and 3) the process requires excessive time and expense to travel through two furnaces.

It is an object of this invention to provide a one-step process for removing polymers from nickel-coated structures and annealing the nickel structure.

It is a further object of this invention to reduce shrinkage of nickel structures that result from thermal decomposition and annealing.

It is a further object of this invention to facilitate rapid polymer removal from nickel-coated polymer structures.

SUMMARY OF INVENTION

The method of the invention produces nickel structures from nickel-coated polymer substrates. The nickel-coated polymer substrate has a nickel outer layer and initially has a temperature where the outer nickel layer lacks burst openings. Rapidly exposing the nickel-coated polymer substrate to a temperature of at least about 600° C. thermally decomposes the polymer substrate and bursts holes through the outer nickel layer. The gases resulting from the thermally decomposed polymer substrate escape through the holes through the outer nickel layer to leave a nickel structure. Finally, annealing the nickel structure increases strength of the nickel structure to produce a ductile foam product.

DESCRIPTION OF PREFERRED EMBODIMENT

Figure 1:
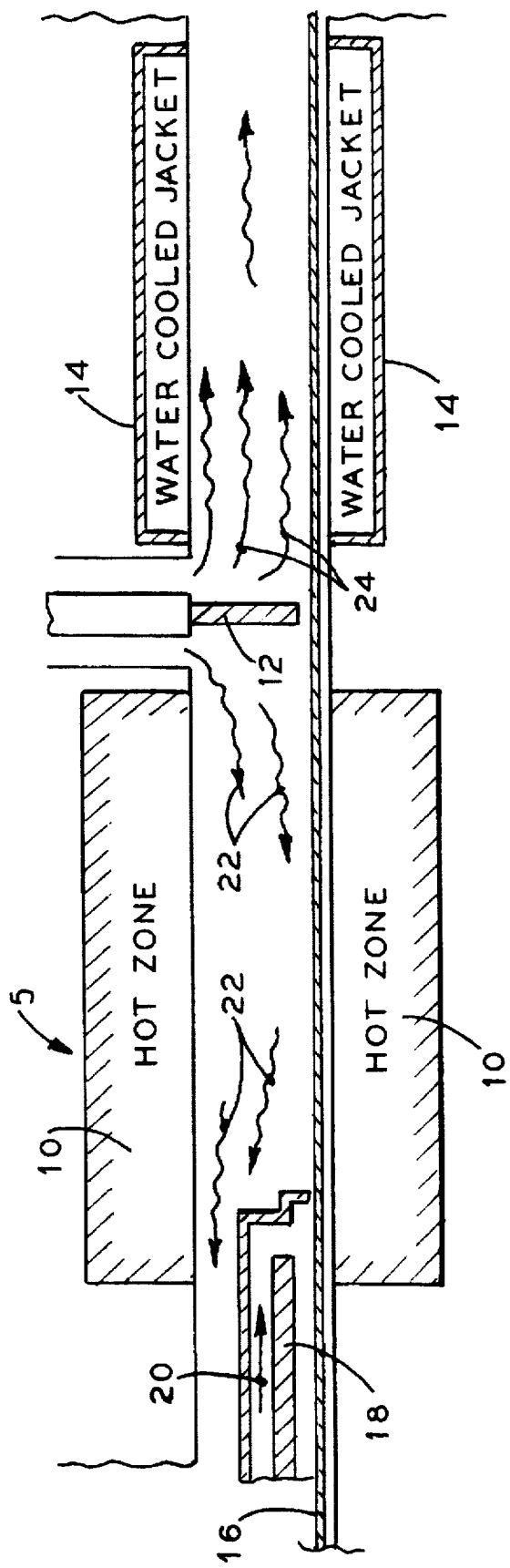
FIG. 1 is a schematic drawing of a two-zone-controlled-atmosphere belt furnace.

The process of the invention relies upon the rapid heating of nickel-coated polymer substrates to facilitate carbon removal. Rapid heating of these nickel-coated structures quickly converts the polymer to gaseous decomposition products. These gases form a relatively large internal pressure within the nickel structure that bursts the outer nickel layer to provide gas escape holes. These newly formed holes allow efficient oxidation and removal of the polymers. Furthermore, these holes reduce the shrinkage of the nickel foam during annealing.

Increasing the rate of heating the polymer trapped within the nickel coating increases the number of holes blown through the nickel skeleton. This results in less decomposition products exiting per hole and therefore leaves a thinner carbonaceous deposit on the outer surface of each hole piercing the nickel skeleton. In addition, increasing the polymer heating rate increases the fraction of gases in the decomposition products, further decreasing the amount of tar-like carbonaceous deposits.

This rapid temperature increase is critical to effectively removing the carbon and reducing shrinkage. Quickly exposing the nickel-coated polymer substrate from a condition where the outer nickel layer contains no holes to a temperature of at least about 600° C. creates sufficient internal pressure to form several holes. This quick temperature increase must occur in less than about twenty-five seconds to prevent the slow release of gases through a small number of holes. Similarly, if the nickel coating contains burst openings prior to heating, the rapid heat-up process generates fewer holes and loses effectiveness. Advantageously, exposing the nickel-coated substrate to a temperature of at least 700° C. in less than fifteen seconds further promotes polymer removal and reduces shrinkage. Most advantageously, exposing the nickel-coated polymer substrate to a temperature of at least 800° C. in less than about ten seconds bursts a sufficient number of holes to quickly discharge the gases. Exposing the nickel foam from temperatures below the decomposition temperature of the foam to increased temperatures in quicker times further increases effectiveness of the process of the invention. For example, exposing the nickel-coated polymer substrate from a temperature less than 200° C. to a temperature of at least 900° C. temperature in less than five, two or even one second further improves polymer removal, reduces the amount of tar-like deposits on the outer surface of the nickel skeleton and reduces shrinkage of the nickel foam.

The following increase the rate a furnace heats a nickel-coated substrate:

1) using a physical barrier to shield the nickel-coated polymer from radiative heat and hot furnace gases (convective heat) at the furnace entrance;

2) increasing foam speed to minimize exposure of the foam to intermediate temperatures that thermally decompose foam;

3) increasing furnace temperature to increase the rate of radiative heat transfer to the nickel-coated polymer; and 4) increasing furnace-gas-flow rate or changing furnace-gas composition to increase rate of convective heat transfer to the nickel-coated polymer.

The upper limit of the furnace temperature is a temperature slightly below the melting temperature of nickel. Most advantageously, the furnace exposes the nickel foam to a temperature sufficient to anneal the nickel structure in a single pass. For example, setting the furnace at a temperature between about 800° C. and about 1200° C. allows a belt furnace to sinter nickel foam in one pass. Alternatively, using a rapid heat-up followed by a separate annealing process provides an acceptable, but more costly, procedure for forming nickel foam.

The polymer structure may consist of a reticulated foam structure, closed cell structure, felt or any combination thereof. Acceptable polymer substrates include: polyester, polyurethane, polystyrene, polyvinylchloride, polyethylene, polyisocyanurates, polyphenols and polypropylene. These polymers all thermally decompose on rapid heating to leave high purity nickel foam with minimal shrinkage.

Referring to FIG. 1, a continuous belt furnace 5 most advantageously provides the means for heating the nickel-coated structure. The divider 12 separates the hot zone of furnace 10 from the cooling zone within water-cooled jacket 14. During operation, nickel-coated polymer 16 continuously travels about 1 m through the hot zone of furnace 10 to the cooling zone. Cooling insert 18 protects foam from gradual heating and premature burning before entry into the hot zone of furnace 10. Specifically, cooling gases 20 purge the atmosphere within the cooling insert 18 to maintain the polymer substrate below its decomposition temperature. Most advantageously, an inert or reducing gas continuously purges cooling insert 18.

After the foam passes the cooling insert 18, the furnace 10 rapidly heats the foam 16 to a temperature well above the decomposition temperature of the polymer. The hot zone of furnace 10 advantageously contains a gaseous mixture of hydrogen and water vapor 22 that is oxidizing to carbon and reducing to nickel. Optionally, this gas may be diluted with an inert gas such as nitrogen or substituted for with an atmosphere of equivalent oxygen partial pressure such as that obtained by partially combusting natural gas.

After removing the polymer substrate and annealing the resulting nickel structure within the hot zone, the nickel structure passes about 1 m through water-cooled jacket 14. The water-cooled jacket 14 cools the nickel structure to a temperature where nickel is stable in an air atmosphere. Introducing inert or reducing gases 24 into the cooling zone of cooling jacket 14 prevents oxidation of the nickel structure during cooling. Most advantageously, nitrogen gases purge the cooling zone of any oxidizing gases.

The following Examples demonstrate the effectiveness of rapid heat-up for removing carbon, minimizing shrinkage and minimizing total processing time. All Samples were processed in the furnace illustrated by FIG. 1 using a nitrogen purge in the cooling zone, unless specifically stated otherwise.

EXAMPLE 1

Example 1 demonstrates the effect of rapid heat-up on carbon removal and shrinkage.

The Samples consisted of four 28 cm by 40 cm rectangular pieces cut from a roll of nickel-plated polyurethane foam. Total densities of these Samples varied from 597 g/m$^2$ to 615 g/m$^2$. The polyurethane foam substrate accounted for approximately 58 g/m$^2$ of the nickel-plated foam, with the nickel accounting for the balance. The two-zone controlled atmosphere belt furnace of FIG. 1 heated all Samples. But the cooling insert was not present for the testing of Example 1. The starting polyurethane foam was approximately 2.2 mm thick and contained about 80 pores per inch (ppi) or 31 pores per centimeter (ppcm).

The hot zone of the furnace exposed Sample 1 to an atmosphere maintained at 800° C. The atmosphere in the furnace hot zone and the cooling zone consisted of flowing nitrogen. Quickly sliding Sample 1 into the middle of the furnace hot zone on a slider plate effected rapid heat-up. After 200 seconds, quickly sliding Sample 1 to the cooling zone of the furnace effected cooling in a protective atmosphere.

For the testing of Sample 2, the furnace belt speed was 30 cm/min, providing a hot zone residence time of approximately 200 seconds. Thus, this test exposed Sample 1 and Sample 2 to essentially the equivalent atmosphere and temperature for the same length of time. The only significant parameter change was heat-up rate.

The test parameters of Samples 3 and 4 were identical to Samples 1 and 2, except for increasing the furnace hot zone temperature to 1000° C. Analyses included dimensional changes, carbon assays, oxygen assays and visual observations. Table 1 below provides data obtained from testing Samples 1 to 4.

TABLE 1

| Sample No. | Temp. (°C.) | Time (sec) | Total Density (g/m$^2$) As-Plated | Total Density (g/m$^2$) Annealed | Δ Length (%) | Δ Width (%) | C (ppm) | O (ppm) |
|---|---|---|---|---|---|---|---|---|
| 1 | 800 | 200 | 615 | 545 | 0.50 | 0.18 | 2510 | 490 |
| 2 | 800 | 200* | 601 | 563 | −2.11 | −2.32 | 5050 | 980 |
| 3 | 1000 | 200 | 610 | 550 | 0.00 | −1.07 | 1950 | 230 |
| 4 | 1000 | 200* | 597 | 553 | −2.11 | −1.79 | 4020 | 590 |

*Furnace belt rate of 30 cm/min.

As seen in Table 1, the rapid heating of Samples 1 and 3 significantly reduces residual carbon for a specific time at temperature. In addition, increasing hot zone temperature to 1000° C. further decreased residual carbon. Visual observations indicate that rapid heat-up leads to an increase in the number of holes blown through the nickel skeleton. Numerous small spots covered Sample 1. These small spots consisted of carbon residue surrounding eruption sites. In contrast, Sample 2 had a noticeably lower spot density, but the spots were of larger diameter and darker, indicating a thicker tar-like carbonaceous deposit at each eruption site. Sample 3 was similar to Sample 1, except that there was a higher carbon spot density and the carbon spots were of smaller diameter and lighter. Sample 4 had a lower density of large, dark carbon spots than Sample 2, but was still much worse than Sample 1.

EXAMPLE 2

Example 2 provides a direct comparison between the subject sintering method, two stage sintering and single stage sintering processes that use uncontrolled heat-up rates.

Samples 5 to 7 consisted of 28 cm by 40 cm rectangular pieces cut from a roll of nickel-plated polyurethane foam. These Samples all had fine edge cracks introduced by the cutting process. Total densities of these Samples varied from 252 g/m$^2$ to 260 g/m$^2$. The polyurethane foam substrate accounted for approximately 58 g/m$^2$ of the nickel-plated foam, with the nickel accounting for the balance. The starting polyurethane was approximately 1.7 mm thick and contained 90 ppi (35 ppcm). The controlled atmosphere belt furnace of FIG. 1 lacked the cooling insert for Samples 5 and 6.

Sample 5 was processed using conditions simulating traditional two-stage sintering methods. Pre-burning was simulated by quickly sliding Sample 5 into the furnace hot zone with an atmosphere of free flowing air and a temperature of 700° C. The polymer of Sample 5 ignited in approximately 2 seconds and a flame persisted on the foam surface for approximately 19 seconds. Sample 5 remained in the furnace hot zone for a total of 120 seconds. Sample 5 grew 2.8% in length and 2.9% in width during pre-burning. After pre-burning, Sample 5 was black, brittle and had some edge cracks. The pre-burned Sample 5 assayed 400 ppm C and 6.96% O. This level of oxygen represents oxidizing approximately 27.5% of the nickel.

The annealing portion of the two-stage processing of Sample 5 was conducted in the belt furnace at a speed of 8 cm/min and a hot zone temperature of 1000° C. The atmosphere contained counter-currently flowing gas consisting of 15% H$_2$, 30% H$_2$O and balance N$_2$. Flow rates of 16.7 L/min H$_2$, 25 mL/min H$_2$O (water) and 61 L/min N$_2$ produced this atmosphere. On sintering, Sample 5 shrank 4.3% in length and 4.9% in width, giving overall dimensional changes of −1.5% in length and −2.1% in width. Sintered C and O assays were 360 ppm and 300 ppm respectively. Final nickel density was 216 g/m$^2$. No carbon residue was visible at polyurethane eruption sites. But fine edge cracks, present after pre-burning, extended on sintering, presumably due to the stresses associated with the dimensional changes.

Test conditions simulating single-stage polymer removal and annealing with slow initial heat-up treated Sample 6. For testing Sample 6, the furnace maintained a hot zone temperature of 1000° C. The furnace atmosphere was counter-currently flowing 15% H$_2$, 30% H$_2$O and balance N$_2$. The belt was 4 cm/min for 9 minutes, then the belt speed was increased to 32 cm/min. This gave the same approximate hot zone residence time as setting the continuous belt speed at 8 cm/min. The muffle extended from the front of the furnace a sufficient distance to ensure that the foam was under the sintering atmosphere for heat-up.

Shrinkage of Sample 6 on sintering was 8.2% in length and 3.2% in width. Sintered carbon and oxygen assays of Sample 6 were 360 ppm and 400 ppm respectively. Final nickel density of Sample 6 was 220 g/m$^2$. No carbon residue was visible at polyurethane eruption sites. But fine edge cracks, present in the as-plated material, extended on sintering.

Single stage sintering with rapid heat-up conditions were used for Sample 7. The cooling insert of FIG. 1 rapidly exposed the polymer to severe pyrolyzing conditions and prevented nickel foam from being gradually heated in the belt furnace. The insert diverted hot furnace gasses away from the foam surface and prevented premature exposure of the foam to radiative heat. Furthermore, room temperature nitrogen was purged through the cooling insert to maintain the foam below temperatures of thermal decomposition and prevent inward flow of hot furnace gases. For testing Sample 7, the furnace temperature was 1000° C., the sintering atmosphere was counter-currently flowing 15% H$_2$, 30% H$_2$O and balance N$_2$, and the belt speed was 20 cm/min. The cooling insert maintained the temperature inside the insert below 150° C., while immediately beyond the insert the furnace temperature was 1000° C. The transition zone was approximately 1.5 cm long, corresponding to approximately 4.5 seconds of belt travel time.

Dimensional changes on sintering were less than 0.1% in both length and width. Sintered C and O assays were 430 ppm and 460 ppm respectively. No residue was visible at eruption sites. Importantly, none of the fine edge cracks present in Sample 7 propagated. Table 2 below provides dimensional changes and chemical assays for the three Samples:

TABLE 2

Comparison of Two-Stage Sintering, Single-Stage Sintering and Single-Stage Sintering with Rapid Heat-Up.

| Sample | Sintering Process | Nickel Density (g/m$^2$) As-Plated | Nickel Density (g/m$^2$) Annealed | Δ Length (%) | Δ Width (%) | C (ppm) | O (ppm) |
|---|---|---|---|---|---|---|---|
| 5 | Two-stage | 202 | 216 | −1.5 | −2.1 | 360 | 300 |
| 6 | Single-stage | 198 | 220 | −8.2 | −3.2 | 360 | 400 |
| 7 | Single-stage w Rapid Heat-up | 194 | 196 | 0.0 | 0.0 | 430 | 460 |

EXAMPLE 3

Example 3 demonstrates continuous sintering of low density nickel foam using rapid heat-up technology.

The test Sample consisted of a 20 m length of nickel-plated polyurethane foam. The polyurethane foam was approximately 1.8 mm thick and contained about 100 ppi (39 ppcm). Nickel density was approximately 300 g/m$^2$ for about the first 18 m and approximately 200 g/m$^2$ for the remaining 2 m. The furnace atmosphere consisted of 50% H$_2$, 25% H$_2$O and 25% N$_2$ maintained at 1000° C. Foam feed speed and belt speed were identical at 20 cm/min.

Trimming the foam to a uniform 28 cm width prior to removing the polymer allowed monitoring of any dimensional change. The single-step process of Example 3 rapidly removed the polymer and annealed the nickel foam without cracking or leaving carbon spots.

A 28 cm×92 cm piece cut from the same roll of as plated polyurethane foam (approximately 310 g/m$^2$ Ni) provided a comparative test sample. Single stage sintering without rapid heat-up was conducted using the furnace described in FIG. 1 with the cooling insert removed. The furnace atmosphere was 10% $H_2$, 20% $H_2O$ and balance $N_2$. Furnace temperature was 1000° C. and the belt speed was 10 cm/min. Despite the higher oxygen partial pressure and the longer residence time at temperature, the Sample exited the furnace lightly spotted. Furthermore, the Sample shrunk approximately 5.5% in length and 7.8% in width. The above clearly demonstrates the advantage of rapid heat-up for improving carbon removal and reducing shrinkage.

For all of the Samples in the above three Examples the changes in thickness were approximately the same as the corresponding changes in length and width.

The new rapid heat-up process provides several advantages over the conventional two-step burn and anneal processes of the prior art. The rapid heat-up process improves the speed and effectiveness of carbon removal from nickel structures. In addition, the process of the invention provides a continuous one-step polymer removal and annealing process for producing ductile nickel structures from nickel-coated structures. Finally, the rapid heating of nickel-coated foam reduces shrinkage of the nickel foam to maximize foam production. The reduced shrinkage maintains the high porosity of nickel foams. These high porosity foams increase battery capacity by allowing the loading of increased quantities of "active mass" to batteries for a specific volume.

While in accordance with the provisions of the statute, this specification illustrates and describes specific embodiments of the invention. Those skilled in the art will understand that the claims cover changes in the form of the invention and that certain features of the invention provide advantages without the use of other features.

We claim:

1. A method of producing nickel structures comprising the steps of:

a) providing a nickel-coated polymer substrate, said nickel-coated polymer substrate having an outer nickel layer and said nickel-coated polymer substrate being at a temperature where said outer nickel layer lacks burst openings, b) heating said nickel-coated polymer substrate by exposing said nickel-coated polymer substrate to a temperature of at least about 600° C. in less than about five seconds to thermally decompose polymer substrate and cause gaseous decomposition products of the polymer to form a large internal pressure and burst holes through said outer nickel layer of said nickel-coated polymer substrate, c) discharging gases from the thermally decomposed polymer substrate through said holes through said outer nickel layer to leave a nickel structure, and d) annealing said nickel structure to increase strength of said nickel structure.

2. The method of claim 1 wherein said heating includes exposing said nickel-coated polymer substrate to a temperature of at least 900° C. to anneal the nickel structure.

3. The method of claim 2 wherein said heating includes sending said nickel-coated polymer substrates through a continuous furnace and said annealing includes sending said nickel structure through a belt furnace.

4. The method of claim 1 wherein a protective insert maintains temperature of the nickel-coated polymer substrate below the melting temperature of the polymer prior to said heating.

5. The method of claim 1 wherein a protective insert maintains temperature of the nickel-coated polymer substrate below about 200° C. prior to said heating.

6. The method of claim 1 wherein said heating is to a temperature of at least 600° C. in less than three seconds.

7. The method of claim 1 wherein nickel carbonyl-coated polymer substrate is heated.

8. The method of claim 1 wherein said nickel-coated polymer substrate heats to a temperature of 700° C. in less than three seconds.

9. The method of claim 1 wherein said heating includes exposing said nickel-coated foam to a hot zone of a single furnace maintained at a temperature between about 800° C. and about 1200° C.

10. A method of producing nickel structures comprising the steps of:

a) providing a nickel-coated polymer substrate, said nickel-coated polymer substrate having an outer nickel layer and a temperature of less than about 200° C., b) heating said nickel-coated polymer substrate by exposing said nickel-coated polymer substrate to a temperature of at least about 700° C. in less than one second to thermally decompose polymer substrate and to cause gaseous decomposition products of the polymer to form a large internal pressure and burst holes through said outer nickel layer, c) discharging gases from the thermally decomposed polymer substrate through said holes through said outer nickel layer to leave a nickel structure, and d) annealing said nickel structure to increase strength of said nickel structure.

11. The method of claim 10 wherein said heating includes exposing said nickel-coated polymer substrate to a temperature of at least 900° C. to anneal the nickel structure.

12. The method of claim 11 wherein said heating includes sending said nickel-coated polymer substrates through a continuous furnace and said annealing includes sending said nickel structure through a belt furnace.

13. The method of claim 10 wherein a protective insert maintains temperature of the nickel-coated polymer substrate below the melting temperature of the polymer prior to said heating.

14. The method of claim 10 wherein a protective insert maintains temperature of the nickel-coated polymer substrate less than about 200° C. prior to said heating.

15. The method of claim 10 wherein said heating is to a temperature of at least 800° C.

16. The method of claim 10 wherein said heating includes exposing said nickel-coated foam to a hot zone of a single furnace maintained at a temperature between about 800° C. and about 1200° C.

17. The method of claim 10 including the additional step of cooling said annealed nickel structure in an atmosphere not oxidizing to nickel.

* * * * *